United States Patent [19]

Mikkelsen

[11] Patent Number: 4,934,257
[45] Date of Patent: Jun. 19, 1990

[54] METHOD FOR BREWING BEVERAGES IN PORTIONS, SUCH AS FRESHLY BREWED COFFEE, IN PACKAGES AND AN ASSEMBLY FOR CARRYING OUT SAID METHOD

[75] Inventor: Per W. Mikkelsen, Odense SV, Denmark

[73] Assignee: Wittenborg A/S, Odense C, Denmark

[21] Appl. No.: 227,641

[22] Filed: Aug. 2, 1988

[30] Foreign Application Priority Data

Aug. 18, 1987 [DK] Denmark .............................. 4305/87

[51] Int. Cl.$^5$ .............................................. A47J 31/00
[52] U.S. Cl. .......................................... 99/279; 99/298; 426/77; 426/86; 426/433
[58] Field of Search ................. 99/279, 295, 297, 298, 99/323; 426/433, 77, 86

[56] References Cited

U.S. PATENT DOCUMENTS 1,238,759  9/1917  Gonsalves .
2,743,664  5/1956  Dale .
3,822,013  7/1974  Veken ................................. 99/295
4,627,334 12/1986  Shanklin .............................. 426/77

FOREIGN PATENT DOCUMENTS 2164457  3/1986  United Kingdom .

Primary Examiner—Robert W. Jenkins
Attorney, Agent, or Firm—Ladas & Parry

[57] ABSTRACT

A method and an assembly for brewing beverages in portions, such as freshly brewed coffee, in packages, where at first an outer cup is delivered to a filling means conveying the cup below successive ingredient delivering means and a water feeding means for filling the first outer cup with the desired liquid and corresponding flavorings. Then a filtering means places a second, inner cup on the surface of the liquid in the outer cup, whereupon the inner cup is pressed into the outer cup by means of a piston means. The inner cup comprises a bottom acting as a filter for the liquid. During the compressing of the two cups the liquid is enclosed in an air-tight space between the two cups, the volume of said space being gradually reduced during the compressing. This results in a filtering of the liquid in the outer cup upwards into the inside of the inner cup during the compressing. The residue is left between the two cups. The resulting package is then ready to be delivered. The two cups forming the package are suitably formed in such a way that their top edges engage each other by snap action, thus resulting in a stable unit. The enclosed residue is removed together when the package being thrown away, when the beverage has been consumed.

9 Claims, 4 Drawing Sheets

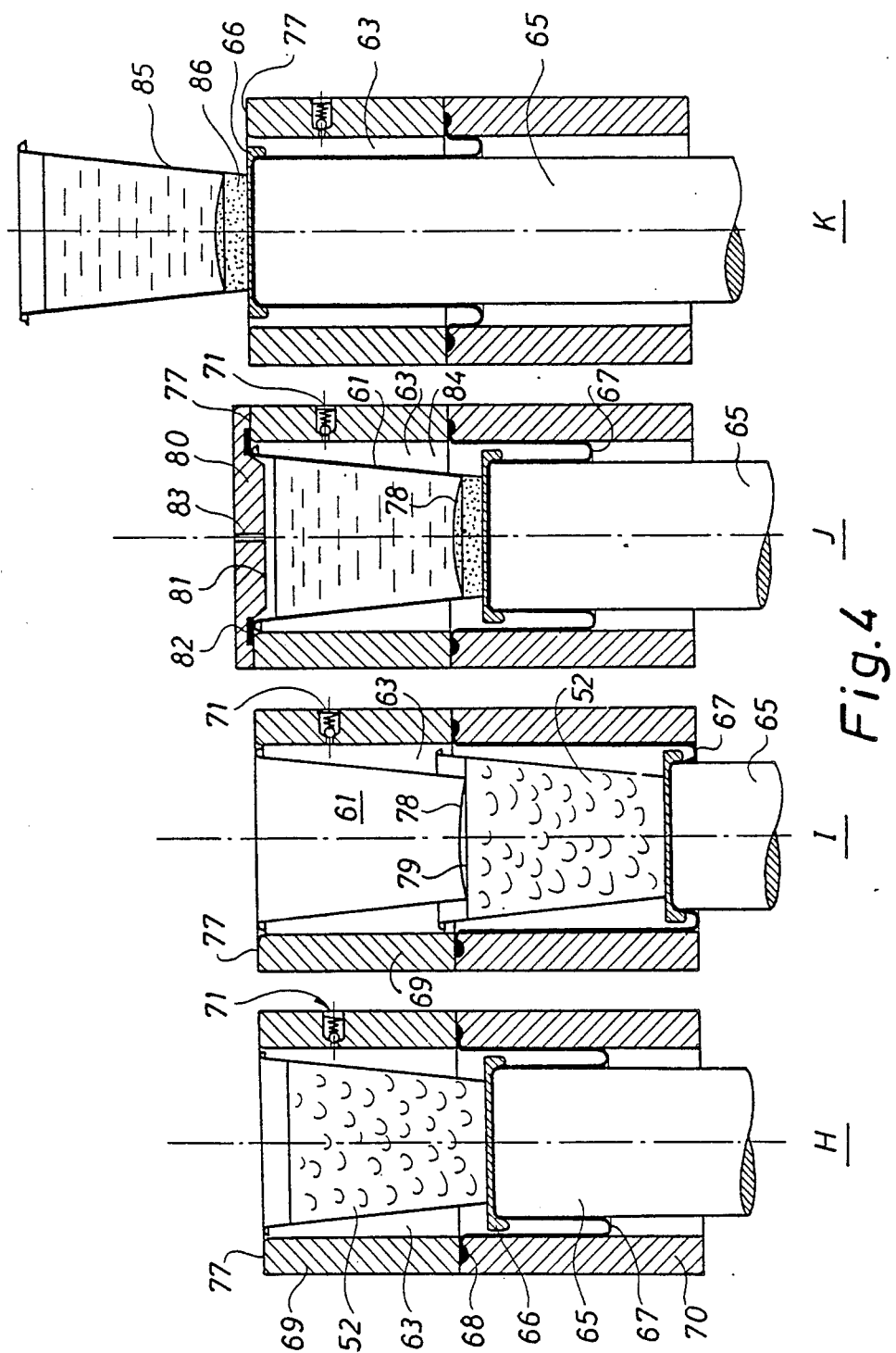

METHOD FOR BREWING BEVERAGES IN PORTIONS, SUCH AS FRESHLY BREWED COFFEE, IN PACKAGES AND AN ASSEMBLY FOR CARRYING OUT SAID METHOD

FIELD OF THE INVENTION

The invention relates to a method for brewing beverages in portions, such as freshly brewed coffee, in packages, said method comprising filling a first, outer cup with amounts of a flavored material, such as coffee, water and further ingredients, such as sugar and cream, where said amounts correspond to the amounts sufficient for one portion.

BACKGROUND ART

When brewing beverages in the presence of flavorings, such as freshly ground coffee or tea leaves, resulting in a residue after the brewing, said residue is known to cause problems with respect to its disposal and to cleaning. This is especially true in vending machines, where the number of portions of the brewed beverage to be prepared is to be as large as possible. When these vending machines are equipped with means to prepare brewed beverages from flavorings resulting in a residue, these machines require more frequent maintenance than those without such means.

SUMMARY OF THE INVENTION

The object of the invention is to provide a method and an assembly enabling the preparation of beverages, such as freshly brewed coffee, without it being necessary to remove the residue and to clean the machine due to the presence of residue.

The object of the invention is accomplished by a second, inner cup being positioned on top of the first, outer cup after the filling of the latter, said inner cup comprising a bottom acting as a filter and resting directly on the surface of the liquid, the two cups subsequently being compressed simultaneously with the liquid being pressed through the bottom of the inner cup during the filtering process.

This results in a package comprising two cups fitted into each other, both containing the brewed beverage as well as the resulting residue enclosed between the two cups and thus removed from, for instance, a vending machine together with the package. Advantageously the two cups are adapted in such a way that the inner cup is locked to the outer cup by snap action. This method is similar to the way a cover is locked to a cup in a common vending machine, for instance, of the type described in U.S. Pat. No. 4,625,776.

During the brewing only the cups come into contact with the flavorings and water. As a result there are no special requirements with regard to cleaning due to the presence of undissolved residue.

An assembly for carrying out the inventive method said assembly comprising means for delivering the cups and the portioned amounts of ingredients and means for receiving the first, outer cup while it is filled with a liquid comprising the desired ingredients, wherein the assembly comprises means for receiving a second, inner cup and positioning it on top of the first, outer cup after the filling of the latter, said inner cup comprising a bottom acting as a filter and resting directly on the surface of the liquid, and the means for receiving the outer cup and the means for receiving the inner cup establish a pressure difference between the inside of the inner cup and the open part of the surface of the liquid between the cups, and the assembly comprises means for compressing the two cups while the above pressure difference is maintained so that the liquid in the outer cup is filtered into the inner cup.

This results in an advantageous assembly for carrying out the inventive method.

In a prefered embodiment of the invention the means for receiving the outer cup and the means for receiving the inner cup provide a substantially air-tight, closed space between the two cups enclosing the open part of the surface of the liquid between the cups, and the means for compressing the two cups move the inner cup into the outer cup while the volume of the air-tight space is reduced in such a way that the liquid in the outer cup is filtered into the inner cup.

According to the invention the means for receiving the second, inner cup comprise a sleeve-shaped part, one end of which is adapted to be in air-tight engagement with an adjacent end of the means for receiving the outer cup at least during the brewing step, the other end of said sleeve-shaped part being provided to cooperate in an air-tight manner with an end wall sealingly abutting the upper periphery of the inner cup during the compressing of the two cups, said end wall comprising an air outlet radially inside said periphery, and the means for receiving the first, outer cup form an air-tight, annular wall between the outside of the outer cup and the sleeve-shaped part and abut in a substantially air-tight manner the outside of the outer cup. This results in an especially simple embodiment of the inventive assembly.

In another prefered embodiment the means for receiving the outer cup comprise an annulus enclosing the outer cup during the compressing, while an end wall at the opposite end of the sleeve shaped part is a piston coaxially displaceable in said sleeve-shaped part, said piston pressing the inner cup coaxially into the outer cup.

In a further prefered embodiment the means for receiving the first, outer cup comprise a piston coaxially displaceable with the outer cup, said piston supporting the cup as well as an annular rolling membrane forming an air-tight connection between one end of the sleeve-shaped part and the periphery of the displaceable piston, and the end wall at the other end of the sleeve-shaped part is in stationary engagement with said part and supports the inner cup, while the piston displaces the outer cup upwards around the inner cup. This results in an especially advantageous embodiment of the inventive assembly.

Finally the present invention relates to a cup used for preparing a beverage, such as freshly brewed coffee, wherein the cup comprises a bottom provided with perforations allowing the passage of the drinkable part of the liquid prepared during the brewing. Such a cup is suitably used as the inner cup in the inventive assembly.

BRIEF DESCRIPTION OF THE DRAWINGS

The invention is described in greater detail below and with reference to the accompanying drawings, in which FIG. 4 is a vertically sectional view showing the different stages of the brewing process in the embodiment of FIG. 3.

DESCRIPTION OF THE PREFERRED EMBODIMENTS

Figure 1:
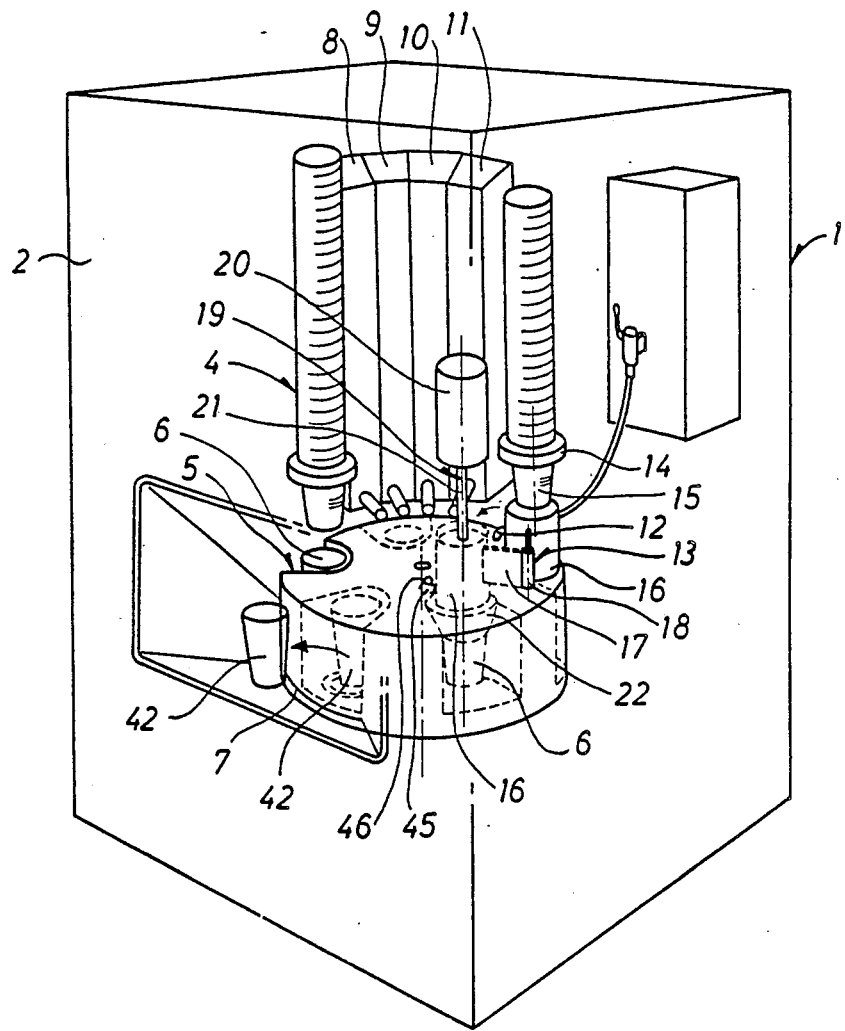
FIG. 1 is a diagrammatic, perspective view of a vending machine with a first embodiment of the inventive assembly, where some parts have been omitted for the sake of clarity.

The vending machine of FIG. 1 having the general reference numeral 1, is provided, as indicated, with a cabinet 2 comprising an assembly having the general reference numeral 3 and preparing brewed portions of beverages. The vending machine 1 is of the same type as the one disclosed in U.S. Pat. No. 4,625,776 and comprises a cup dispenser 4, dispensing one cup at a time to a filling means 5, when the machine is activated. During the rotation of the filling means the filling of a cup 6 with the desired beverage is ensured. Subsequent to the filling the cup is delivered via an opening 7, only indicated in FIG. 1.

During the rotation of the filling means, starting with the dispensing of the cup 6 at the cup dispenser 4 until the opening 7 on the front of the vending machine, the cup passes below a number of ingredient delivering means 8, 9, 10 and 11. The ingredient delivering means comprise in a manner known per se containers for flavorings, such as coffee, sugar, or powder for the preparation of soft drinks, each delivering means comprising its own delivering arrangement and being of a known type. After having passed the ingredient delivering means 8 11 the cup 6 is conveyed to a position below a known water feeding device 12. Then the cup is conveyed to a filtering means 13 activated when the beverage in question requires filtration due to the presence of a residue or a filter cake.

The filtering means 13 comprises a further cup dispenser 14 dispensing a second cup 15 to a sleeve-shaped brewing cylinder 16 below, when the filtering means is activated, cf. FIG. 1. The brewing cylinder 16 is rotatably journaled around a vertical axis 18 via a radially projecting arm 17 (not shown). When the filtering means 13 is activated the brewing cylinder 16 with the cup 15 is rotated into such a position above the conveyed cup 6 that the brewing cylinder 16 is coaxial with respect to the cup 6. FIG. 1 illustrates two positions of the brewing cylinder, i.e. below the cup dispenser 14 and in a coaxial position with respect to the cup 6. It should be noted, however, that in the prefered embodiment only a single brewing cylinder 16 reciprocating between the two positions is used. At the position at the filling means 5, where the cup 6 is coaxial to the brewing cylinder 16, there is a piston means 19 with corresponding motor 20. The piston rod 21 of the piston means 19 extends coaxial to the cup 6 in this position and reciprocates in coaxial direction.

Figure 2:
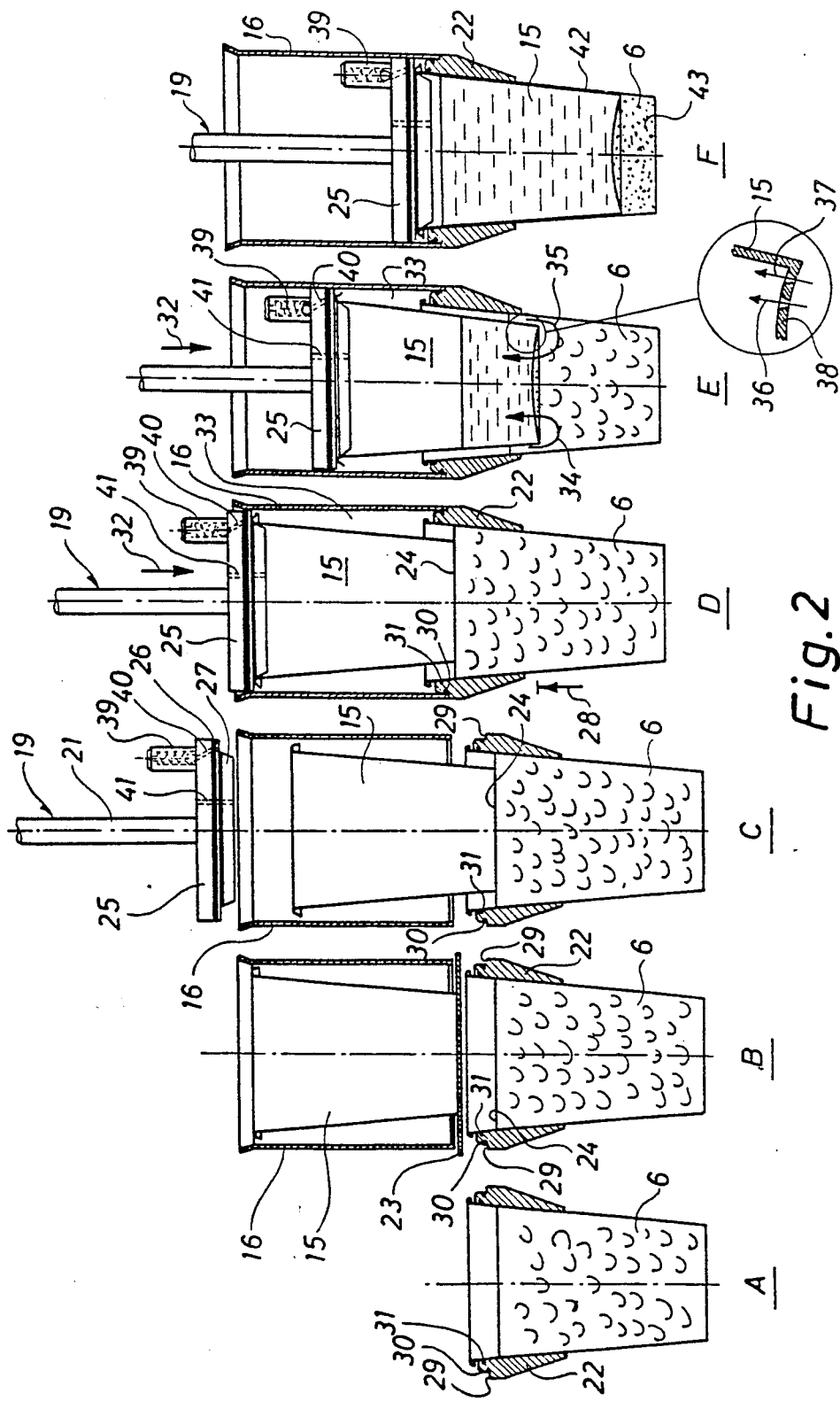
FIG. 2 is a vertically sectional view through a package for receiving a freshly brewed beverage, showing the different stages of the brewing process together with the relevant parts.

FIG. 2 illustrates parts of the filtering means 13 in greater detail during different, successive steps of the filtering process. The steps are shown at representations A, B, C, D, E and F. As is apparent from representation A illustrating a cup 6 filled with the desired liquid comprising a mixture of flavorings and hot water etc. the cup 6 is suspended in a cup holder ring 22 of the same type as the one used in the vending machine disclosed in the above-mentioned U.S. Pat. No. 4,625,776. The cup 6 is refered to in the following as the outer cup.

Representation B illustrates the outer cup 6 suspended in a cup holder ring 22 in a position adjacent to the one, where the brewing cylinder 16 is coaxial to the outer cup 6. As is apparent from representation B, the brewing cylinder 16 comprises a cup 15 dispensed by the second cup dispenser 14, said cup 15 being supported by a suitable support plate 23 during the movement of the brewing cylinder 16. For the sake of clarity the support plate 23 has been omitted in FIG. 1. The support plate 23 is formed in such a way that it enables the supported cup 15 to fall freely onto the surface 24 of the liquid in the outer cup 6, when the brewing cylinder is coaxial to the outer cup 6. The second cup 15 is in the following refered to as the inner cup. Representation C illustrates the inner cup 15 with its bottom resting directly on the surface 24 of the liquid. The brewing cylinder 16 is, as mentioned before, coaxial to the outer cup 6 and directly below the piston means 19.

The inner cup 15 is provided with a bottom (not shown) perforated in such a way that it enables the filtering of the beverage in question from the outside to the inside in a manner described below in greater detail with reference to the representation E, cf. FIG. 2.

The lower end of the piston rod 21 of the piston means 19 is provided with a piston 25, the outside of said piston carrying a circumferential sealing ring 26. Along a circumferential zone the side of the piston facing downward is adapted to enter in sealing engagement with the top edge of the inner cup 15. As shown in the drawing the piston 25 has a frusto-conical projection 27 dimensioned in such a way that it fits into the aperture of the inner cup 15.

Representation D illustrates the activated piston means 19. In this position the outer cup 6 is displaced upwardly, as indicated by the arrow 28, via the cup holder ring 22, until said ring is in sealing engagement with the adjacent end of the brewing cylinder 16. For this purpose the cup holder ring 22 is suitably equipped with a circumferential recess 29 with a corresponding sealing ring 30. To ensure a corresponding sealing engagement between the cup holder ring 22 and the outer cup 6, the inner side of the cup holder ring 22 is provided with a circumferential sealing 31. The upward displacement of the cup holder ring is achieved by means of a driving mechanism (not shown) also causing the vertical reciprocating movement of the cup holder ring during the rotation of the filling means 5.

Simultaneously the piston 25 moves from its top position vertically downwards in the direction shown by the arrow 32. During this movement the piston 25 is in sealing engagement with the inner side of the brewing cylinder 16 and in sealing engagement with the top edge of the inner cup 15. The frusto-conical projection 27 guides the inner cup 15 into a correct position with respect to the outer cup 6 as well as with respect to the piston 25. As is apparent, the two cups 15 and 6 enclose an air-tight space 33, the internal pressure of which influences the part of the liquid surface 24 around the inner cup 15.

During the continuous downward movement of the piston 25 the air-tight space 33 is reduced, cf. representation E. Simultaneously the inner cup 15 is pressed down into the outer cup 6. The resulting overpressure in the air-tight space 33 influences the surface 24 of the liquid in such a way that the liquid is filtered into the inside of the inner cup 15 while passing through the bottom acting as a filter. The filtering is indicated by the arrows 34, 35 and, in the enlarged section of representation E showing the cup 15, by arrows 36, 37 adjacent the bottom 38. As is apparent from FIG. 2 the piston 25 is provided with a safety valve 39 communicating with the air-tight space 33 via a conduit 40. The safety valve 39 ensures that the pressure in the air-tight space is maintained at a predetermined pressure. To further ensure that the air can flow unhindered out of the inside of the inner cup 15 there is a through opening 41 in the piston 25.

When the piston 25 has reached its lower position, cf. representation F, the inner cup 15 has been pressed so far into the inside of the outer cup 6 that substantially only a filter cake of, for instance, coffee grounds is left between the two cups. At the same time the top edge of the inner cup 15 is pressed into engagement with the top edge of the outer cup 6. For this purpose the top edge of the inner cup 15 is advantageously formed in such a way that it locks onto the top edge of the outer cup 6 by snap action.

The beverage in question is now brewed and ready for consumption. The package 42 comprising the compressed cups 6 and 15 is delivered via the opening 7 of the vending machine in a manner known per se subsequent to the cup ring holder 22 having been lowered. The filter cake 43 is inside the package 42 and is thus removed in a simple manner without causing any inconveniences to the person enjoying the beverage or the person maintaining the machine. During the brewing no part of the assembly is in contact with the beverage. Consequently the brewing poses no special demands for the cleaning.

When the brewing is completed the piston means 19 is returned to its starting position at a level above the brewing cylinder 16. The brewing cylinder is automatically returned to its starting position below the second cup dispenser 14. The movement of the brewing cylinder 16 is achievable by any desired method. It can, for instance, be returned to its correct position with respect to the outer cup 6 by means of a projection 45 on the outside of the brewing cylinder 16, said projection cooperating with a dog means 46 on the filling means 5, cf. FIG. 1.

Figure 3:
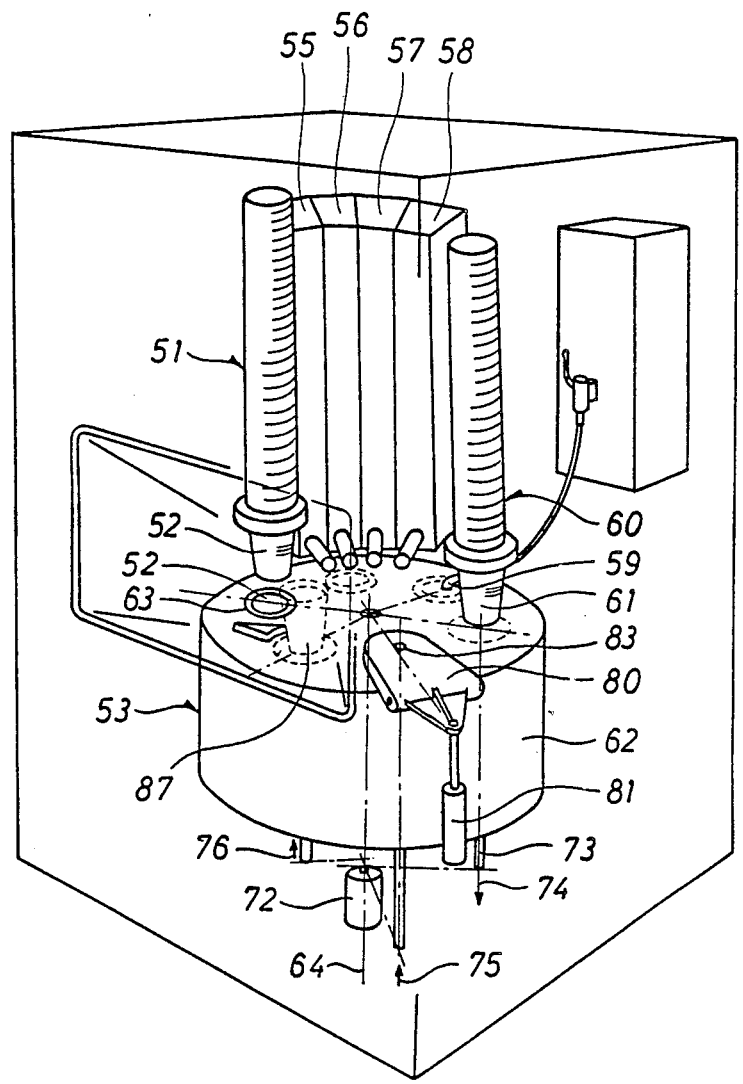
FIG. 3 is a diagrammatic, perspective view of a vending machine with a second embodiment of the inventive assembly, where some parts have been omitted for the sake of clarity.

FIG. 3 is a diagrammatic view of another embodiment of a vending machine for delivering brewed beverages. This vending machine comprises also a cabinet having the general reference numeral 50. In this embodiment the beverages are also prepared inside the cabinet and the finished beverage is delivered from an opening on the front of the vending machine. The beverage is prepared by an assembly comprising a cup dispenser 51 delivering, when suitably activated, an outer cup 52 of the same type as the outer cup 6 of the above embodiment. The outer cup 52 is conveyed to a filling means 53 and through this filling means 53 to successive ingredient delivering means 55, 56, 57 and 58, as well as to a water feeding means 59 in the same manner as described above. After having passed the water feeding means 59 the outer cup 51 is conveyed to a second cup dispenser 60 in the filling means, said dispenser dispensing an inner cup 61 of the same type as the above inner cup 15.

The filling means 53 differs slightly from the above filling means 5. It comprises a rotor 62 with a cup chamber 63 for receiving the outer cup 52 during the rotation of the filling means 53 around its vertical central axis 64.

FIG. 4 illustrates different steps during the rotation of the filling means 53. The bottom of the cup chamber 63 is defined by a vertically displaceable piston 65 the upper end of which carries a support plate 66 acting as a support for the outer cup 52 in the cup chamber 63. Simultaneously, the support plate is a fastening means for an annular rolling membrane 67. The outer, circumferential periphery 68 of said membrane is sealingly fastened between two sleeve-shaped or cylindrical, coaxially positioned, tube-like pieces 69, 70 defining the cup chamber 63. The wall of the top tube-like piece 69 comprises a safety valve 71 being in communication with the cup chamber.

During the rotation of the filling means 63 the piston 65 ensures that the outer cup 52 is positioned as desired, seen in the vertical direction. This is achieved by vertical displacement of the piston 65 by means of a corresponding motor 72, cf. FIG. 3. The motor influences the piston rod 73 of the piston 65 in a manner not shown. The piston rod 73 is in FIG. 3 shown in three different positions with corresponding arrows 74, 75 and 76 indicating the different displacement directions.

In FIG. 4 the cup chamber is shown at four different steps by means of representations H, I, J and K. Representation H shows the cup chamber 3 with the piston 65 in such a position that the top edge of the outer cup 52 flushes with the top surface of the rotor, i.e. the top edge 77 of the sleeve-shaped, tube-like piece 69. The cup chamber is in this position when it receives the cup 52 and during the subsequent passage of said cup below the various ingredient delivering means 56.58 and water feeding means 59. After having passed the water feeding means 59 the outer cup 52 is filled with a liquid comprising the desired ingredients, cf. representation H. When the ingredients are flavorings leaving a residue the second cup dispenser is activated to dispense an inner cup 61 when the cup chamber is in a position coaxial to said second dispenser 60. Then the piston 65 is lowered so that the top edge of the inner cup 61 flushes with the top edge 77 of the cup chamber when the inner cup 61 is in a position where its bottom 78 rests on the surface 79 of the liquid in the outer cup 65. The movement of the inner cup 61 down to the correct position on the surface 79 of the liquid is guided by means of the surrounding sleeve shaped, tube-like piece 69. When the cup chamber has reached the step illustrated in representation I, the cups 52 and 61 are conveyed to a position directly below a pressing plate 80. The pressing plate 80 is fastened to a piston cylinder means 81, cf. FIG. 3, enabling the vertical displacement of the pressing plate. The lower surface of the pressing plate 80 is provided with a frusto-conical projection 81 fitting exactly into the opening of the inner cup 61. A suitable sealing ring 82 surrounds the projection 81, said sealing ring providing a sealing engagement with the top edge 77 of the cup chamber and with the top edge of the inner cup 61, when the pressing plate 80 is suitably activated and lowered to abut the top edge. This occurs directly after the cups 52 and 61 have been conveyed below the pressing plate 80.

The center of the pressing plate 80 is provided with a through hole 83.

When the pressing plate is in sealing engagement with the top edge 77 of the cup chamber 63 and with the top edge of the inner cup 61 an air-tight space 84 is obtained between the two cups. The bottom of said space is defined by the rolling membrane 67. During the subsequent activation of the piston 65 to a vertical upward movement, the inner cup 61 and the outer cup 52 are compressed, just as in the embodiment of FIGS. 1 and 2. Simultaneously, filtering takes place via the bottom 78 of the cup 61 as a result of the reduction of volume in the air-tight space 84. The pressure in the air-tight space 84 is maintained at a predetermined, suitable pressure by means of the safety valve 71. During the filtering the air in the inside of the inner cup 61 flows out unhindered through the through hole 83 in the pressing plate 80.

Representation J illustrates the cup chamber 63 when the filtering is completed. Here the piston 65 is in its top position and the pressing plate 80 is pressed against the top edge 77 of the cup chamber 63.

When the filtering is completed the beverage in question is ready for delivery. At first the pressing plate 80 is lifted whereupon the cup chamber is removed from under the pressing plate. The finished package 85 is then raised. It comprises the compressed cups 61 and 52 with the filter cake 86 enclosed between said two cups and the brewed beverage inside the inner cup. The raising of the package 85 continues until the support plate 66 flushes with the top edge 77 of the cup chamber 63, as shown at the reference numeral 87 in FIG. 3. In this position the package 85 is automatically delivered through the opening of the cabinet 50 to the customer by not-shown means, when the filling means 53 continues its rotation.

FIGS. 1 and 3 both illustrate a number of cup chambers, but each filling means comprises only one cup chamber. Thus only one beverage at a time is brewed.

The assembly and the method for the preparation of a brewed beverage disclosed use inner cups with a bottom acting as a filter. These cups can be prepared in various ways, for instance, by injection moulding of integral parts made of the same material or by vacuum moulding with subsequent forming of the perforations in the bottom. In a further alternative the bottom of can be made of nylon net or another suitable net material, said net being fastened to a bottomless cup.

The other parts of the assembly are made of materials known for the manufacture of said vending machines.

The invention is described in its prefered embodiments. Many alterations can, however, be made without thereby deviating from the scope of the invention. The successive steps of the brewing process, cf. FIGS. 2 and 4, can, for instance, take place at the same location without the use of a rotating filling means. The relevant feature of the present invention is that subsequent to the outer cup being filled with a liquid the inner cup is pressed into the outer cup under such pressure conditions that the liquid is filtered upwards through the bottom of the inner cup. After the beverage is brewed the package of the beverage can, for instance, be manually removed from the pressing station. In this case the brewing machine is especially simply arranged and suitable for the preparation of filled packages on a relatively small scale.

I claim:

1. An assembly for brewing beverages and dispensing same in packages, said assembly comprising means for delivering cup and portioned amounts of various beverage ingredients, means for receiving a first, outer cup while it is filled with a liquid and desired ingredients, means (14, 16; 60, 69) for receiving a second, inner cup (15, 61) and positioning it on top of the first, outer cup (6,52) after the filling of the latter, said inner cup comprising a bottom (38, 78) acting as a filter and resting directly on the surface (24, 79) of the liquid, the means (22; 65, 67) for receiving the outer cup (6, 52) and the means (14, 16; 60, 69) for receiving the inner cup (15, 61) establishing a pressure difference between the inside of the inner cup (15, 61) and the open part of the surface of the liquid between the cups, and means (19; 80, 81) for compressing the two cups into a package while said pressure difference is maintained so that the liquid in the outer cup (6, 52) is filtered into the inner cup (15, 61).

2. An assembly as in claim 1, wherein the means (22; 65, 67) for receiving the outer cup (6, 52) and the means (14, 16; 60, 69( for receiving the inner cup (15, 61) provide a substantially air-tight, closed space (33, 84) between the two cups enclosing the open part of the surface (24, 79) of the liquid between the cups, and the means (19; 80, 81) for compressing the two cups move the inner cup (15, 61) into the outer cup (6, 52) while the volume of the air-tight space (33, 84) is reduced in such a way that the liquid in the outer cup (6, 52) is filtered into the inner cup (15, 61).

3. An assembly as in claim 2, wherein the means (14, comprise a sleeve-shaped part (16, 69), one end of which is adapted to be in air-tight engagement with an adjacent end of the means (22; 65, 67) for receiving the outer cup (6, 52) at least during the brewing step, the other end of said sleeve-shaped part being arranged to co-operate in an air-tight manner with an end wall (25, 80) sealingly abutting the upper periphery of the inner cup (15, 61) during the compressing of the two cups, said end wall including an air outlet (41, 83) radially inside said periphery, and the means (22; 65, 67) for receiving the first, outer cup (6, 52) form an air-tight, annular wall between the outside of the outer cup (6, 52) and the sleeve-shaped part (16, 69) and abut in a substantially air-tight manner the outside of the outer cup (6, 52).

4. An assembly as in claim 3, wherein the means (22; 65, 67) for receiving the outer cup (6, 52) comprise an annulus (22) enclosing the outer cup (6, 52) during the compressing, while said end wall (25, 80) at said other end of said sleeve shaped part (16, 69) is a piston (25) coaxially displaceable in said sleeve-shaped part, said piston pressing the inner cup (15, 61) coaxially into the outer cup (6, 52).

5. An assembly as in claim 3, wherein the means (22; 65, 67) for receiving the first, outer cup (6, 52) comprise a piston (65) coaxially displaceable with the outer cup, said piston supporting the cup (6, 52) as well as an annular rolling membrane (67) forming an air-tight connection between one end of the sleeve-shaped part (69) and the periphery of the displaceable piston (65), and the end wall (80) at said other end of the sleeve-shaped part (69) is in stationary engagement with said part and supports the inner cup (61), while the piston displaces the outer cup (52) upwards around the inner cup.

6. An assembly as in claim 5, wherein the top surface of the cup-supporting piston (65) is displaced upwards to the level of the upper end (77) of the sleeve-shaped part (16) when the end wal (80) is removed for delivering the package (85) with the brewed beverage formed by the cups.

7. An assembly as in claim 3, wherein the sleeve-shaped part (16) is rotatably journaled in such a way that it reciprocates horizontally between a first position, where it is coaxial to the cups (6, 15) while there are compressed, and a second position, where it is removed from said cup compressing position.

8. An assembly as in claim 7, wherein the sleeve-shaped part (16) receives the inner cup (15) while the part is in its second position and, when it is in the second position, the sleeve-shaped part (16) is positioned above a plate (23) for supporting the inner cup until the latter freely falls down onto the surface (24) of the liquid in the outer cup (6) when the sleeve-shaped part (16) is rotated to its first position.

9. An assembly as in claim 1 including a safety valve (39, 71) communicating with the air-tight space (33, 84).

* * * * *